Patented Oct. 9, 1934

1,976,700

UNITED STATES PATENT OFFICE 1,976,700

ELECTROLYTE FOR USE WITH FILMED ELECTRODES

Julius Edgar Lilienfeld, Winchester, Mass., assignor to Ergon Research Laboratories, Inc., Malden, Mass., a corporation of Delaware No Drawing. Application October 31, 1931, Serial No. 572,295

1 Claim. (Cl. 175—315)

The invention relates to electrolytes for use with filmed electrodes as in electrolytic condensers, etc., and particularly to electrolytes of relatively high specific resistance.

It has for an object the provision of an extremely high resistance electrolyte, though not above operating limits, and one which shall be substantially free from alkaline components in order to obtain a relatively low electric leak between electrodes immersed therein. Devices utilizing the same have a higher break-down voltage, require also a lower biasing voltage for alternating current operation, and entail a reduction of that part of the power loss which is due to the dielectric of the filmed electrode.

A further object of the invention resides in the addition to such electrolyte of metal (electropositive) ions whereby its resistance is appreciably reduced, thereby also reducing that part of the power loss which is due to the resistance of the electrolyte. It has been found, furthermore, that a layer is more stable in such electrolytes inasmuch as it better retains its organized condition during idling periods so that the electric leak subsequent to the idling is materially reduced.

The electrolyte embodying the present invention contains a free weak acid such as boric acid, salicylic acid, etc., and is substantially free of ions with a single positive charge—usually termed alkaline components—such as sodium, potassium, etc., including ammonium, and to the extent of containing not more than ¼ of 1% thereof. These requirements may be fulfilled either by utilizing solutions as aqueous solutions or alcoholic solutions of said acids; or, by providing an electrolyte in which the weak acid is contained in molecular association with molecules of the electrolyte and thus providing a partial free presence of the weak acid.

As an example of electrolytes of the first-named type, a weak acid, such as pure boric acid, salicylic acid, etc., is dissolved in water to provide a substantially saturated solution thereof, care being taken to utilize a product which is also substantially free of any alkaline components. Also, various proportions of an alcohol with water, or with boric acid, salicylic acid, etc., may be utilized.

In my copending application, Serial Number 560,140, I have disclosed electrolytes of the second-named type, the same being in the nature of a condensation product of an alcohol and a weak acid and wherein the latter will be present to an appreciable extent.

Heretofore, it has been the practice to reduce the resistance of electrolytes of the nature of boric acid, salicylic acid, etc., by the addition of appreciable amounts of an alkali salt such as sodium borate, sodium salicylate, etc. However, the action of such alkalis, especially upon aluminum containers for the electrolyte is particularly objectionable in that a corrosive effect thereon results. Moreover, I have found in the operation of electrolytic condensers that an electrolyte free from alkaline components is particularly desirable, more especially for the reasons hereinbefore recited.

The specific resistance of both the aforesaid types of the electrolyte is comparatively high and would generally be prohibitive except in devices utilizing narrowly spaced electrodes. Even in the case of such devices, it may be desirable under certain conditions to somewhat reduce the specific resistance of the novel electrolyte. This reduction may be variously attained, as by the introduction of metallic, non-alkaline ions into the electrolyte or by utilizing a finely-divided, conductive filler such as lamp black, aluminum dust, etc.

The electropositive metal ions may be obtained from copper, nickel, chromium, cadmium, cobalt, zinc, etc., it being understood in the use of the word "metal" in the claim and throughout the specification, that the same is intended to include any of the various noted metals.

These ions may conveniently be introduced into the electrolyte by immersing therein two electrodes (not shown) as of copper, and causing a current to flow therebetween, as is well understood, until the electrolyte becomes substantially saturated with copper ions; or, by adding a suitable salt thereto, as copper borate. The copper ions may also be introduced during the operation of a condenser in which the electrolyte is utilized when said condenser is provided with electrically active surfaces of the metal whose ions are to be introduced, for example, by means of the metal shielding strips set forth in my copending application for electrode structure of electrolytic condensers, filed of even date herewith; but the action will be correspondingly slower. The metallic surfaces aforesaid, moreover, will serve to permanently maintain the ion concentration of the electrolyte by affording an active metallic surface.

I claim:

An electrolyte for electrolytic condensers, consisting of an aqueous solution of substantially pure boric acid.

JULIUS EDGAR LILIENFELD.